United States Patent
Burns et al.

(12) 
(10) Patent No.: US 6,185,804 B1
(45) Date of Patent: Feb. 13, 2001

(54) METHOD FOR REMOVING FAILED GLOW PLUG

(76) Inventors: Brian D. Burns, P.O. Box 70; Robert J. Hammon, P.O. Box 1234, both of Kelseyville, CA (US) 95451

(*) Notice: Under 35 U.S.C. 154(b), the term of this patent shall be extended for 0 days.

(21) Appl. No.: 09/238,206

(22) Filed: Jan. 27, 1999

Related U.S. Application Data

(60) Provisional application No. 60/073,009, filed on Jan. 29, 1998.

(51) Int. Cl.[7] ............................................. B23P 19/00
(52) U.S. Cl. ............................ 29/426.1; 29/426.5; 29/264
(58) Field of Search ............................. 29/426.1, 426.5, 29/402.08, 402.03, 264, 256, 258

(56) References Cited

U.S. PATENT DOCUMENTS

| | | | |
|---|---|---|---|
| D. 275,548 | * | 9/1984 | McDaniel ................................ D8/29 |
| D. 370,608 | * | 6/1996 | Wagner .................................. 29/264 |
| 4,572,032 | | 2/1986 | Kinzler . |
| 4,724,608 | * | 2/1988 | Parrott ................................... 29/264 |
| 5,416,963 | * | 5/1995 | Boynton ................................. 29/264 |
| 5,623,761 | * | 4/1997 | Chiang ................................... 29/260 |
| 5,848,460 | * | 12/1998 | Rasmussen et al. .................. 29/263 |

* cited by examiner

Primary Examiner—S. Thomas Hughes
Assistant Examiner—Jermie E. Cozart

(57) ABSTRACT

A pivoting split nut and spacer assembly used in a method of removing failed glow plugs from diesel engines. Main body halves of the split nut, when assembled together with a pin form the pivoting split nut with opposing front and rear faces, a hexagonal outside periphery and threads on the inside periphery allowing for engagement with the threads of the glow plug. The spacer assembly is fabricated by forming cylindrical spacer bodies, forming lead-in gaps, and tether cables through holes for the tether cables. The tether cables are connected to a cable ring. After removing the sensor wire from the glow plug, a wrenching tool is used to unscrew the glow plug until all threads are exposed. A failure deformation, e.g. swelling on the heating element of the glow plug, is extracted through the narrow combustion chamber passage on a diesel engines' head by installing the pivoting split nut onto the glow plug threads and a spacer between the head and pivoting split nut. A gripping tool is installed onto the pivoting split nut to secure in place and a wrenching tool is installed onto the glow plug. By unscrewing the glow plug, the failure deformation is drawn through the chamber passage.

3 Claims, 4 Drawing Sheets

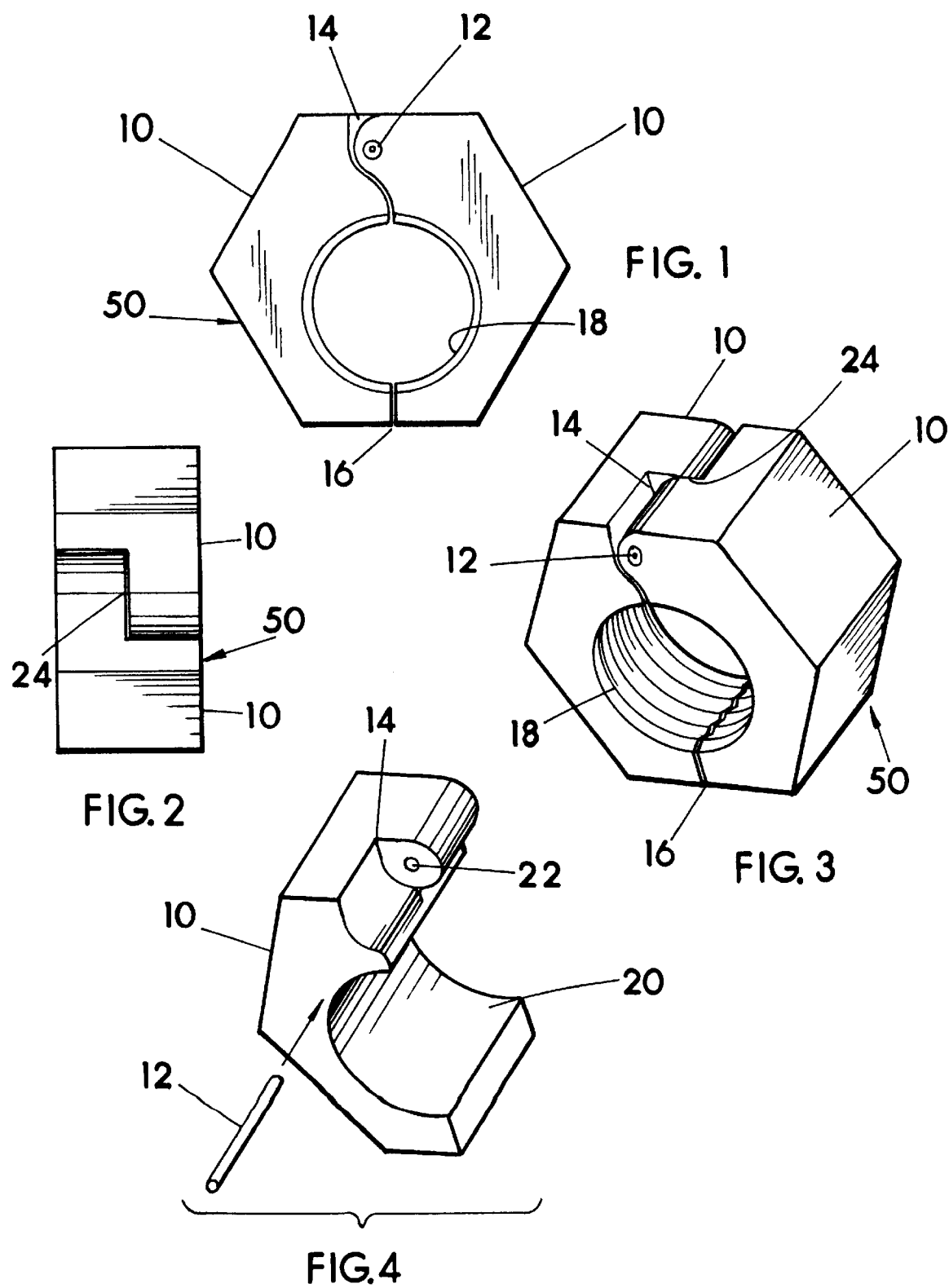

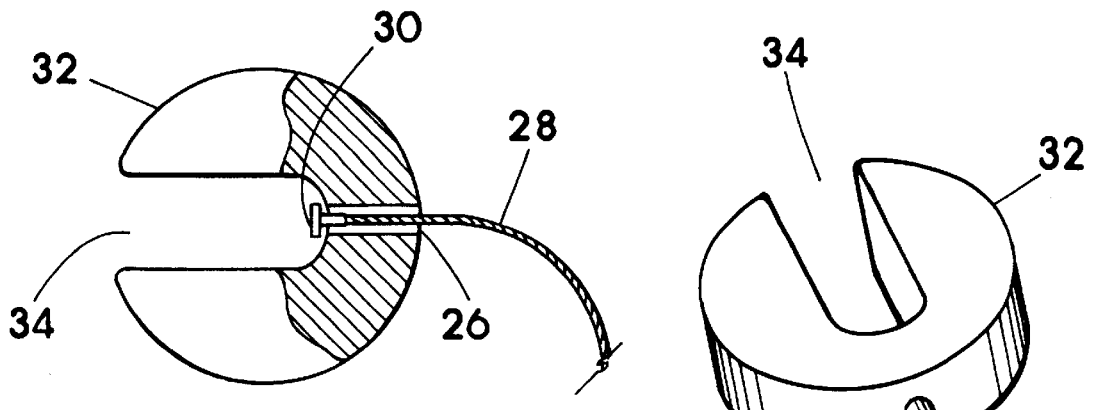
FIG. 9
FIG. 10
FIG. 11
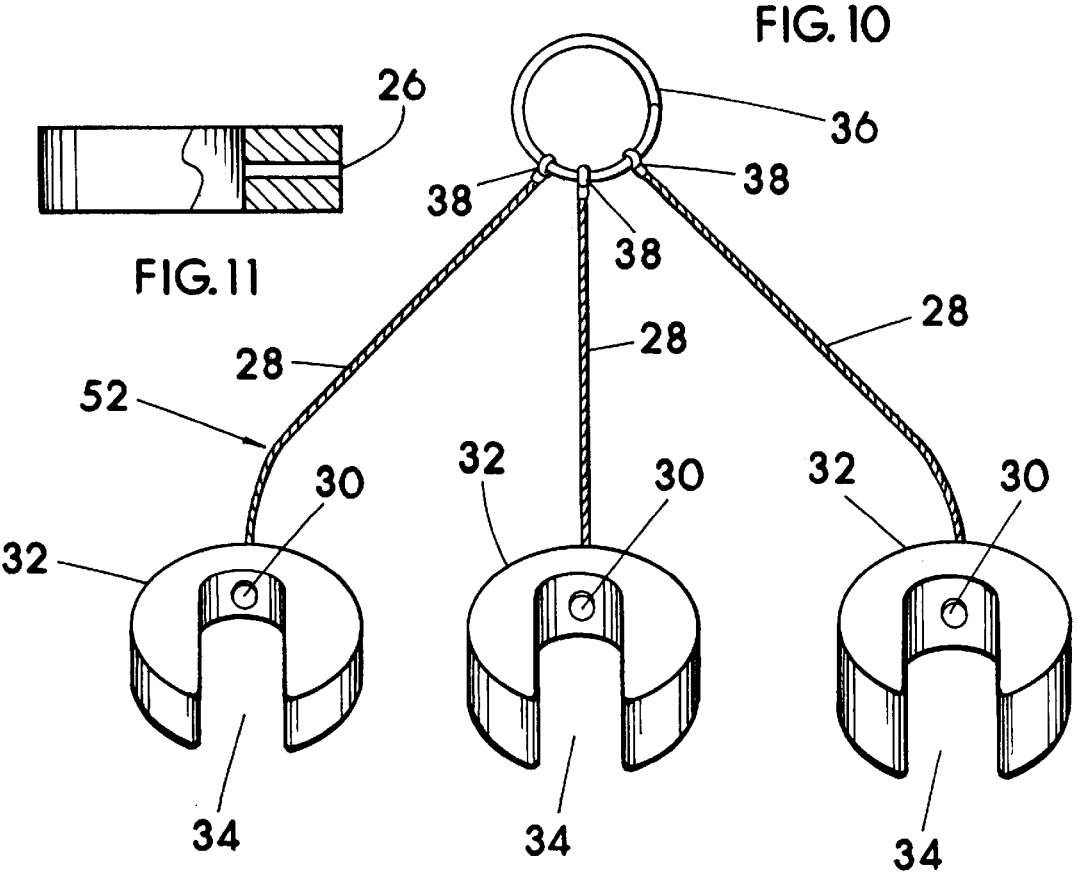
FIG. 12

METHOD FOR REMOVING FAILED GLOW PLUG

A priority claim is hereby made to pending U.S. Provisional application No. 60/073,009 filed Jan. 29, 1998.

BACKGROUND OF THE INVENTION

1. Field of the Invention

The present invention pertains to the removal of failed cold start devices, herein referred to as glow plugs from diesel engines. The invention is applicable in instances, e.g. where a glow plug has failed due to overheating and has caused the heating element of the glow plug to swell at or about the tip of the heating element. This failure would, under normal situations, necessitate the removal of the diesel engine's head assembly and associated hardware to facilitate the removal of a failed glow plug.

2. Description of the Related Prior Art

We are not aware of any closely related prior art structures. Known prior art methods include the use of force to remove the failed glow plugs by applying a type of locking pliers to the exposed end of the glow plug, inserting a pry bar or large screwdriver between the locking pliers and the diesel engine head and attempting to forcefully extract the failed glow plug from the chamber. This is often unsuccessful and will usually result in the breakage of the glow plug's heating element. If the force used to extract the failed glow plug is uneven, the side load force applied to the glow plug will cause the heating element to snap off of the glow plug body and fall inside the diesel engine's head assembly thus necessitating the complete removal of the head assembly and all associated hardware.

Even if the aforementioned techniques were typically successful, performing these techniques is very difficult due to the crowded engine compartments on today's vehicles. A significant portion of the associated hardware surrounding the glow plug needs to be removed in order to accommodate the locking pliers and provide sufficient clearance in which to leverage the pry bar enough to apply adequate force to extract the failed glow plug.

SUMMARY OF THE INVENTION

The present invention provides novel tooling for, and an improved method of removing failed glow plugs from diesel engines, while ensuring no damage to the engine components. Once a glow plug fails, the cold start of a diesel engine becomes more difficult. Because of the failure, the glow plug must be replaced to insure proper starting of the diesel engine. In situations where more than one glow plug fails on the same engine, the cold start becomes nearly impossible. In lieu of disassembling the diesel engine head assemblies and removing all associated components, which is an extremely lengthy and costly exercise, the current invention allows for the easiest and most cost effective method of removing the failed glow plugs.

By removing the electronic sensor wire from the electronic sensor wire connector, a simple socket or wrench can be applied to the glow plug. The socket or wrench is used to unscrew the glow plug as far as possible. Once all of the glow plug threads are exposed, simply apply the pivoting split nut to the glow plug threads by opening the pivoting split nut and installing the pivoting split nut around the threads of the glow plug. The threads of the glow plug and the threads of the pivoting split nut are in alignment when the pivoting split nut closes with minimal closure gap. A spacer, if needed, can be applied by sliding the spacer between the head assembly and the pivoting split nut. Using a spacer enhances the stable, straight extraction of the failed glow plug. A gripping tool, e.g. an open-end wrench, is applied to the pivoting split nut to hold the pivoting split nut in place during the removal procedure. A wrenching tool, e.g. a socket wrench, is re-applied to the glow plug and by using the additional threads provided by the pivoting split nut the extraction procedure is completed by continuing to unscrew the glow plug until the failed portion of the heating element has been completely removed from the head.

BRIEF DESCRIPTION OF DRAWINGS

FIG. 1 shows a front elevational view of a pivoting split nut in the closed position.

FIG. 2 shows a top elevational view of a pivoting split nut in the closed position.

FIG. 3 shows a perspective view of a pivoting split nut in the closed position.

FIG. 4 shows a perspective view of a blank half or member of a pivoting split nut prior to assembly and application of threads.

FIG. 9 shows a front elevational view of a spacer body with a tether cable inserted in a tether cable through hole and a tether cable button stop applied.

FIG. 10 shows a perspective view of a spacer body.

FIG. 11 shows a side elevational view of a spacer body indicating a tether cable through hole.

FIG. 12 shows a perspective view of a completely assembled spacer assembly.

BEST MODES FOR CARRYING OUT THE INVENTION

Referring now to FIGS. 1–8 and FIGS. 13 and 14, the pivoting split nut 50 comprises a pair of opposing main body members or halves 10 each made of a rigid strong material such as metal for example only. Each main body half 10 is preferably identical to the other for lower cost manufacturing thereof. The body halves 10 when assembled together define the pivoting split nut 50 in general. The pivoting split nut 50 may be said to have a front face and an oppositely disposed back face, also identical to that of the front face. The terms "front face" and "back face" are used here as a convenient method of definition only, so as to adequately describe the construction of the pivoting split nut 50. FIG. 1 shows either the front or back face of split nut 50. The outside periphery configuration of the pivoting split nut 50 after assembly is preferably of hexagonal configuration providing flat surfaces, some flat surfaces provided by each of the body halves 10 for gripping with a tool.

Figure 5:
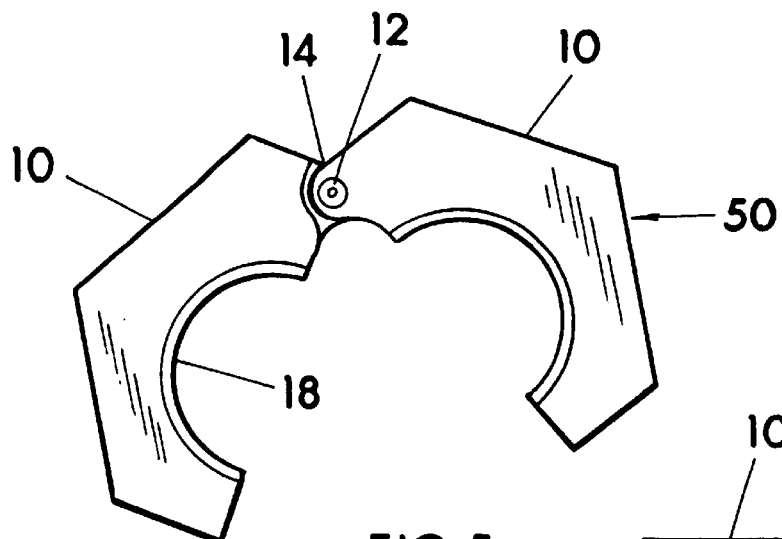
FIG. 5 shows a front elevational view of a pivoting split nut in the open position.
Figure 6:
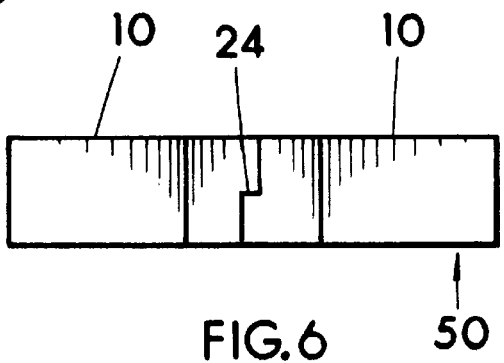
FIG. 6 shows a top elevational view of a pivoting split nut in the open position.
Figure 7:
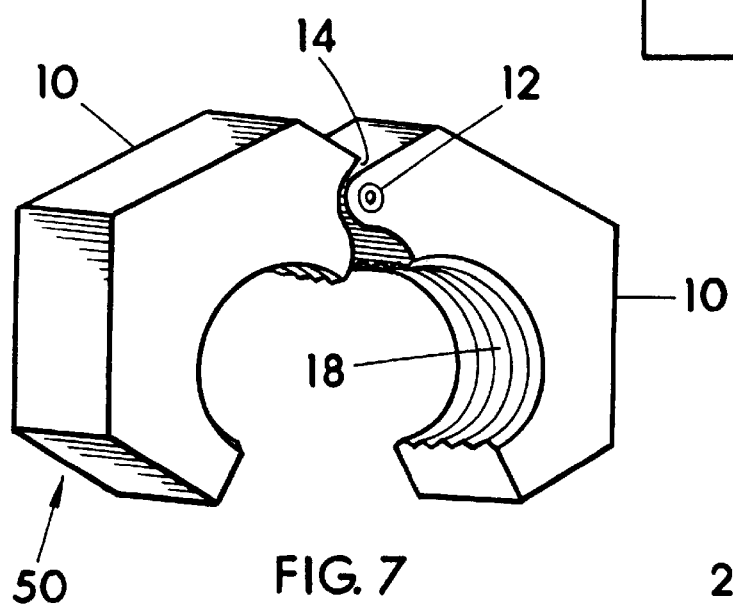
FIG. 7 shows a perspective view of a pivoting split nut in the open position.
Figure 8:
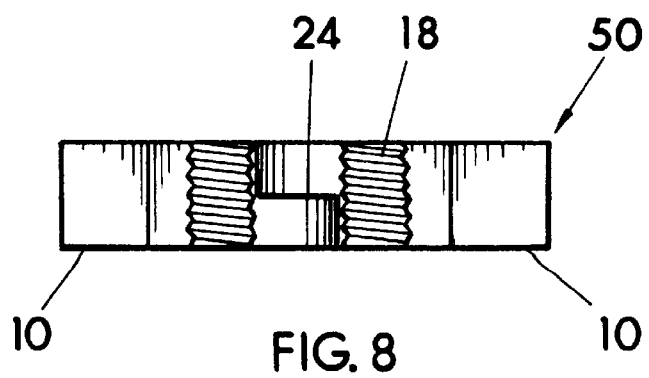
FIG. 8 shows a bottom elevational view of a split nut in the open position.
Figure 13:
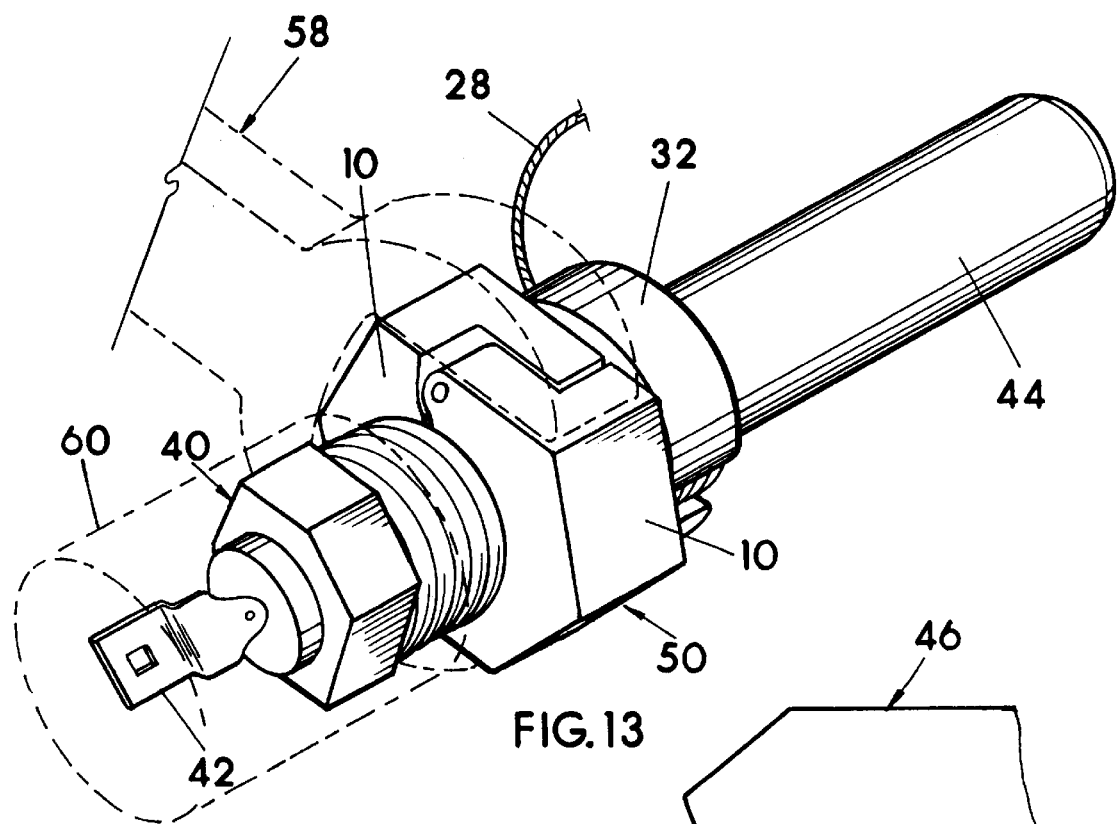
FIG. 13 shows a perspective view of a pivoting split nut and a spacer assembly adapted to a typical glow plug.
Figure 14:
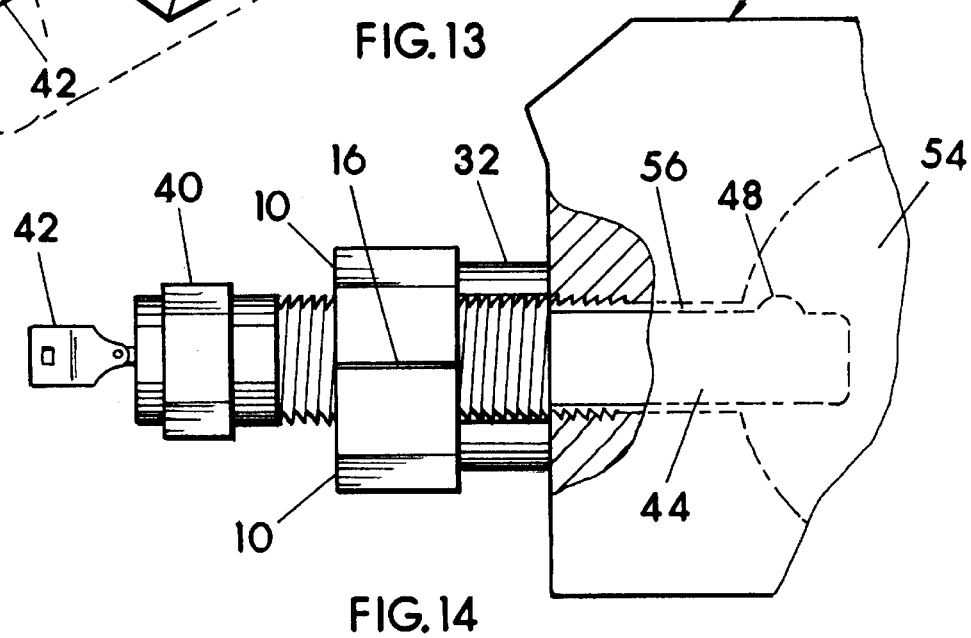
FIG. 14 shows a side elevational view of a pivoting split nut and spacer assembly adapted to a typical glow plug that by virtue of a defect or failure has yet to be removed from a diesel engine head.

Assembling main body halves 10 by installing assembly pin 12 through the assembly pin through holes 22 as shown in FIG. 4 and staking in place, form the pivoting split nut 50 as shown in FIG. 1 and FIG. 3, at this point without threads as shown in FIG. 4, The main body halves 10 are fabricated with semi-circle reliefs as shown in FIG. 4. When pivoting split nut 50 is assembled by joining the main body halves 10 and by installing an assembly pin 12 the opposing semi-circle reliefs form a circular bore in the pivoting split nut 50 when the main body halves 10 are in the closed position as shown in FIG. 1. When closed, the pivoting split nut 50 has a predetermined closure gap 16 built into the design to allow for proper alignment and thread mesh between the pivoting split nut 50 threads 18 and the threads of the glow plug 40 as shown in FIGS. 13 and 14. The opening and closing of the pivoting split nut 50 is accommodated by the opposing radiuses fabricated into the main body halves 10 at the top or pivoting ends, forming a pivot gap 14. Although the assembly pin 12 is fixedly located in place after being inserted in assembly pin through hole 22, the cylindrical configuration of the assembly pin 12 and the cylindrical configuration of the assembly pin through hole 22 allows for ease of movement during opening and closing of the pivoting split nut 50. The circular bore formed by the main body halves 10 is offset from a center axis of the split nut 50 in the direction of the closure gap 16 as shown in FIG. 1 to accommodate applications for use where clearance is of concern. The offset of the circular bore from the central axis of the body also allows more material to remain at the top of the main body halves 10 so as to allow for a sufficiently sized assembly pin 12 and adequate material for the opposing radiuses that make up the pivot gap 14. When assembled prior to the fabrication of the threads 18 the pivoting split nut 50 is held in the closed position and alignment of the main body halves 10 is assured by appropriate tooling methods in preparation to receive the formation of threads 18. The appropriate tooling methods utilized during this operation assures that proper alignment of the threads 18 and the main body halves 10 are maintained during and after the formation of the threads 18. The threads 18 are formed of standard tooling methods and are formed from the front face of the pivoting split nut 50 to the back face of the pivoting split nut 50. Likewise, the formation of the threads 18 can be formed of standard tooling methods from the back face to the front face of the pivoting split nut 50 as shown in FIGS. 1 and 3. The pivoting split nut 50 will accept any gripping tool 58 of adequate size e.g. open-end wrench as shown in FIG. 13.

Referring now to FIGS. 9–12 and FIGS. 13 and 14, the spacer assembly 52 comprises a set of spacer bodies 32, set of tether cables 28, set of tether cable button stops 30, set of cable swedges 38, and a cable ring 36 as shown in FIG. 12. The spacer bodies 32 are fabricated by standard methods to various thicknesses as shown in FIG. 12, and serve as shims. The spacers or spacer bodies 32 can be made of rigid and strong materials such as metal for example only. The spacer body 32 is first formed in a cylindrical configuration as shown in FIG. 9 and is fabricated flat and square on the front face and the back face as shown in FIG. 11. The spacer body lead in gap 34 as shown in FIG. 9 is machined using standard machining practices. The spacer body lead in gap 34 accommodates the glow plug 40 threads when installed for the removal process of the failed glow plug 40 and 48 as shown in FIGS. 13 and 14. A typical failure deformation 48 is shown in FIG. 14. A tether cable through hole 26 is machined of standard machining practices into and through the spacer body 32 as shown in FIGS. 9, 10 and 11. A tether cable button stop 30 is applied to one end of a tether cable 28. The tether cable button stop 30 can be of a variety of configurations so as to not allow the tether cable 28 to pull through the tether cable through hole 26 and become free of the spacer body 32. The tether cable 28 is fabricated and a tether cable button stop 30 is applied as shown in FIGS. 9 and 12. The tether cable button stop 30 can be that of a swedged lead material, or any other method of applying a tether cable button stop 30. The opposite end of the tether cable 28 which connects to the cable ring 36 is inserted through the spacer body through hole 26 and is pulled through completely to the tether cable button stop 30 as shown in FIG. 9. A sufficiently sized loop is formed on the tether cable 28 on the cable ring 36 side of the tether cable 28. The loop should be of adequate size to accommodate the cable ring 36. A cable swedge 38 is applied when the loop is formed to ensure the loop remain permanent. The assembled tether cable 28 with tether cable button stop 30 and cable swedge 38 applied is then attached to the cable ring 36 as shown in FIG. 12. The cable ring 36 is in the style of a standard key ring as shown in FIG. 12. Other devices can be used in lieu of the cable ring 36. Together, the pivoting split nut 50 and spacer assembly 52 makes up the failed glow plug removal tool kit.

Referring now to FIGS. 13 and 14, as is often the case, when a glow plug 40 fails it is usually due to over heating or excessive wear and age. An over heating condition will often cause a typical failure deformation 48 as shown in FIG. 14. This typical failure deformation 48 inhibits the easy removal of the failed glow plug 40. The combustion chamber passage 56 leading to the combustion chamber 54 of a diesel engine head 46 is only slightly larger in diameter than that of the glow plug heating element 44. When a typical failure deformation 48 occurs within the combustion chamber 54 as shown in FIG. 14, the removal process becomes extremely difficult to perform using previous methods.

The current invention provides a simple and cost effective method of safely and cleanly extracting a failed glow plug 40 from a diesel engine head 46. By removing the electronic sensor wire from the glow plug electronic sensor connector 42 the glow plug 40 is accessible with a wrenching tool 60 as shown in FIG. 13. The glow plug 40 is then unscrewed until all of the glow plug 40 threads are exposed as shown in FIG. 14. The pivoting split nut 50 is opened and installed around the threads of the glow plug 40 as shown in FIGS. 13 and 14. A spacer body 32 is selected from the spacer assembly 52 and inserted between the diesel engine head 46 and the pivoting split nut 50. Doing this provides a square base to assist in the clean removal of the failed glow plug 40. In some cases where a shorter style of glow plug 40 is used or a typical failure deformation 48 is located at or within the chamber passage 56 a pivoting split 50 is applied to the threads of the glow plug 40 nearest or abutting the diesel engine head. Thus, eliminating the need for a spacer body 32. The pivoting split nut 50 effectively extends the workable thread surface of the diesel engine head 46 allowing for a continued extraction until the typical failure deformation 48 has been forcefully drawn through the Combustion chamber passage 56. This operation is extremely simple. Once the pivoting split nut 50 and the spacer body 32 have been installed onto the glow plug 40 simply secure the pivoting split nut 50 in position with a gripping tool 58 e.g. open-end wrench as shown in FIG. 13 and place a wrenching tool 60 e.g. socket wrench over the glow plugs' electronic sensor connector 42 as shown in FIG. 13 and onto the hexagon portion of the glow plug 40. Resume extracting the failed glow plug 40 by unscrewing until the glow plug 40 has been completely removed from the diesel engine head 46.

Although we have very specifically described the preferred structures and best modes of the invention, it should be understood that the specific details are given for example to those skilled in the art and are not intended to strictly limit the scope of the invention. Changes in the specific structures and steps described can be made without departing from the scope of the invention, and therefore the scope of the invention is to be determined by the spirit and scope of the appended claims.

We claim:

1. A method of removing a failed glow plug from an engine head, comprising the steps of:

(a) removing a wire from the failed glow plug;

(b) attaching a wrenching tool to the glow plug and unscrewing until all threads of the glow plug are disengaged from the engine head;

(c) locating an open threaded split nut about the threads of the glow plug and closing the split nut to engage threads of the split nut with the threads of the glow plug;

(d) attaching a gripping tool to the split nut so as to maintain the split nut in location;

(e) utilizing the wrenching tool, and further unscrewing the glow plug until the glow plug has been extracted.

2. A method of removing a failed glow plug in accordance with claim 1 wherein said threaded split nut is located when in an opened position about the threads of said glow plug and then pivoted on a hinge to a closed position engaged with the threads of said glow plug.

3. A method of removing a failed glow plug in accordance with claim 2 further including inserting a spacer between the engine head and an adjacent surface of the split nut so as to shim between the engine head and split nut.

* * * * *